(12) United States Patent
Xing et al.

(10) Patent No.: US 7,037,582 B2
(45) Date of Patent: May 2, 2006

(54) METHOD FOR ENCAPSULATING PHASE TRANSITIONAL PARAFFIN COMPOUND THAT CAN UNDERGO PHASE TRANSITION AND MICROCAPSULE RESULTING THEREFROM

(75) Inventors: Jiangwei Xing, Hong Kong (CN); Yi Li, Hong Kong (CN); Edward Newton, Hong Kong (CN); Kwok-Wing Yeung, Hong Kong (CN)

(73) Assignee: The Hong Kong Polytechnic University, Hong Kong (CN)

( * ) Notice: Subject to any disclaimer, the term of this patent is extended or adjusted under 35 U.S.C. 154(b) by 703 days.

(21) Appl. No.: 10/155,175

(22) Filed: May 28, 2002

(65) Prior Publication Data

US 2003/0222378 A1 Dec. 4, 2003

(51) Int. Cl.
*B32B 9/00* (2006.01)
*B01J 13/02* (2006.01)

(52) U.S. Cl. .................... 428/402.21; 264/4.1; 264/4.3; 264/4.32; 264/4.33; 264/4.4; 264/4.7

(58) Field of Classification Search ................. 264/4.1, 264/4.3, 4.32, 4.33, 4.4, 4.7; 428/402.21
See application file for complete search history.

(56) References Cited

U.S. PATENT DOCUMENTS

| | | | |
|---|---|---|---|
| 4,076,774 A | 2/1978 | Short | |
| 4,708,812 A | 11/1987 | Hatfield | |
| 4,756,958 A | 7/1988 | Bryant et al. | |
| 5,290,904 A | 3/1994 | Colvin et al. | |
| 5,456,852 A | 10/1995 | Isiguro | |
| 5,916,478 A | 6/1999 | Nakahira et al. | |

FOREIGN PATENT DOCUMENTS

JP     2-240123     9/1990

*Primary Examiner*—Samuel A. Acquah
(74) *Attorney, Agent, or Firm*—Burns, Doane, Swecker & Mathis, L.L.P.

(57) ABSTRACT

A series of paraffin compounds, the phase change materials (PCMs), were microencapsulated in an interfacial polymerization process to form the double-shell microcapsules with relatively low shell permeability. The inner shell is formed through the reaction between polypropylene glycols and bifunctional polyisocyanates and the outer through the reaction between bifunctional polyisocyanates and polyamines added in the continuous aqueous phase. The so prepared microencapsulated paraffin compounds emulsion can be used as the medium for temperature management in many fields.

21 Claims, 2 Drawing Sheets

METHOD FOR ENCAPSULATING PHASE TRANSITIONAL PARAFFIN COMPOUND THAT CAN UNDERGO PHASE TRANSITION AND MICROCAPSULE RESULTING THEREFROM

FIELD OF THE INVENTION

This invention relates to methods for encapsulating phase transitional paraffin compounds, and the resulting microcapsules.

BACKGROUND OF THE INVENTION

A variety of phase change materials available are well known for their thermal characteristics in that during their phase change stage they can absorb or release the latent heat while the temperature of the material is kept constant. Textiles and other products incorporated with the phase change materials, especially in the microencapsulated forms, may establish a microclimate surrounding the modified goods in the temperature ranges of the melting points of the employed phase change materials (PCMs) and so may meet the requirement for comfort. The use of microencapsulated PCMs may be found in U.S. Pat. Nos. 4,756,958 and 5,290,904.

U.S. Pat. Nos. 5,456,852 and 5,916,478 both describes processes of microcapsule manufacturing employing in situ polymerization, in which formaldehyde used may impose an environmental danger.

Examples of useful inherently flame retardant phase change materials may include halogenated paraffins having 10 to 22 carbon atoms and, more specifically, mono or poly-chlorinated and brominated paraffins such as bromooctadecane, bromopentadecane, bromononodecane, bromoeicosane, bromodocosane, and so on.
Throughout the investigation of the present invention it is found that the micro-encapsulation of paraffin compounds is much more difficult than the relative processes for the other core materials mainly due to the unique characteristics of paraffin compounds.

OBJECTS OF THE INVENTION

Therefore, it is an object of this invention to resolve at least one or more of the problems as set forth in the prior art. As a minimum, it is an object of this invention to provide the public with a useful choice.

SUMMARY OF THE INVENTION

Accordingly, this invention provides a method for encapsulating a core component comprising paraffin compounds that can undergo phase transition. The method includes the following steps:

A dissolving the core component in a first solvent to form a first solution, said first solvent being non-reactive to the core component and includes first monomers to form a first polymer, and the core component being insoluble in the first polymer;

B dispersing the first solution throughout a non-reactive medium that is immiscible with the first solution, to form a dispersion of droplets of the first solution;

C forming an outer second polymer wall at the surface of said droplets of the first solution before the first polymer is formed by adding a second monomer to said dispersion with simultaneous mild stirring, such that the inner first polymer wall is formed inside the outer second polymer wall and cross-links with the outer second polymer wall, and the core component is encapsulated in a double layer microcapsule.

The micro-encapsulation method of this invention is characterized in that the first monomer includes at least two organic compounds, one organic compound having two isocyanate groups and is soluble in the paraffin compound; and a further organic compound is a polypropylene glycol with an average molecular weight higher than 400.

It is another aspect of this invention to provide a dual-wall microcapsule micro-encapsulating a core component comprising paraffin compounds that can undergo phase transition manufactured by the above encapsulation method.

This invention also provides a method of inspecting microcapsule formation by the above micro-encapsulation method including the steps of:

adding 1 to 10 drops of the mixture formed after step C to 25 to 300 ml of water and stirring the resulting mixture;

allowing the resulting mixture to stand for a sufficient period of time;

determining whether the micro-encapsulation process is satisfactory, wherein a satisfactory micro-encapsulation process is characterized by either one of the following observations:

there is no oil or fat floating on the surface of the resulting mixture; or the mixture is clear.

BRIEF DESCRIPTION OF THE DRAWINGS

Preferred embodiments of the present invention will now be explained by way of example and with reference to the accompany drawings in which.

DETAIL DESCRIPTION OF PREFERRED EMBODIMENTS

Figure 1:
FIG. 1 shows the scanning electron micrograph of the microcapsules formed when insufficient polypropylene glycols were used.

This invention is now described by ways of example with reference to the figures in the following paragraphs.

The micro-encapsulation process to form dual-shell microcapsules is described in U.S. Pat. No. 4,076,774, which is now incorporated as a reference herein.

In the process as described in U.S. Pat. No. 4,076,774, the first step of micro-encapsulation may be to dissolve the core component into a first solution containing suitable first monomers. This can have one kind of monomer or a mixture of different monomers. The first monomers can polymerize and form a first polymer forming the inner capsule encapsulating the core component. The core component is insoluble in the first monomer. However, this step cannot happen too soon, at least before the addition of a second monomer to form a second polymer forming the outer capsule encapsulating the first polymer and the core component. Such a dual-shell structure may provide several advantages, including the prevention of core component leakage through permeation.

The first solution formed containing the core component and the first monomers, which can be also called the discontinuous phase, is dispersed in an inert medium that is not reactive to the core component or the first polymer. In order to form the required dispersion, the inert medium, which is often called the continuous phase, shall be immiscible with the first solution. As the core component is usually organic and hydrophobic in nature, water is usually chosen to be the continuous phase. The dispersion is usually carried out at or lower than the ambient temperature to prevent the first monomers, like the polyisocyanate, to react with water in the continuous phase. The first solution in the inert medium then wrap up to form films containing the core component with some strength to resist the affection from the outer environment. Note that the first polymer, or the inner shell, shall not be formed.

After dispersion of the first solution in the non-reactive medium, a second solution containing a second monomer is added. The second monomer is chosen such that it can polymerize to form a second polymer, while at the same time it can react with the first monomer chemically. Accordingly, an outer shell comprising the second polymer can be formed wrapping the dispersion of the first solution in the non-reactive medium. This step is usually performed under vigorous stirring, presumably to avoid the dispersed first solution to aggregate during the formation of the outer-shell.

Suitable candidates of the first monomers employed in the method as described in U.S. Pat. No. 4,076,774 may be poly-functional isocyanates and polyols. Suitable candidates for the second monomer may be poly-functional amines. As used in general organic chemistry, the term "poly-functional chemicals" refers to those chemicals having at least 2 functional groups. Examples of poly-functional isocyanates may include polymethylene polyphenol isocyanate (PAPI), polyhexamethylene diisocyanate and polytolylene 2,4-diisocyanate, while example of polyols may include polyoxypropylene triol Generally, liquid materials with hydrophobic properties are more commonly employed as the core components with the aqueous protective colloid solutions being the vehicles. In accordance with the present invention, paraffin compounds or paraffinic hydrocarbons having 13 to 28 carbon atoms or their mixtures, having phase transitional properties are used as the core component. As the micro-encapsulated PCMs will inevitably be subjected to the conditions of relatively high temperature the microcapsules should possess relatively high retaining properties. In other words the shell permeability of the micro-encapsulated PCMs should be low in order to prevent the phase change materials from releasing in a permeation mode from the microcapsules. In the investigation of the present invention, it was found that all of the employed polyisocyanates with more than two isocyanate groups such as PAPI, polyhexamethylene diisocyanate and polytolylene 2,4-diisocyanate (50 wt % solution in butyl acetate) could not be dissolved in the paraffin compounds. This may due to the non-polar characteristics of the core materials employed. It was found that only the polyisocyanates having two isocyanate groups and three to eight carbon atoms, including the two carbon atoms in the two isocyanate groups could be the candidates as the first monomer. Suitable examples of the first monomer may include tolylenediisocyanate and hexamethylenediisocyanate. However, their reaction with the polyamine in the aqueous phase would obviously lead to the highly permeable shell of the microcapsule. It is believed that the crosslink formed between the bifunctional polyisocyanate with polyamine is less intensive than that formed between tri or more functional polyisocyanates and polyamine, which is not a favorable characteristic of the final micro-encapsulated PCMs.

As described earlier, polyoxypropylene triol is generally added into the first solution in conventional dual-shell micro-encapsulation process to enhance the tightness of the shell enhancing cross-linking. In the investigation of the present invention it is found that the phase transitional paraffin compounds are not compatible with the polyoxypropylene triol and only compatible with the polypropylene glycols with the average molecular weights higher than 400. Polyamines with three or more functional groups such as diethylenetriamine and tetraethylenepentamine are then considered as the candidates since their uses would ensure the tightness of the shell of the MicroPCMs investigated in the case.

It was also found during the investigation of this invention that the dispersion stage cannot be carried at or lower than the ambient temperature, as some of the paraffin compounds having 18 or more carbon atoms employed in the present invention possess melting points higher than 28° C. The bath temperature in the dispersing stages should be kept at least 5° C. higher than the melting point of the core component to ensure that the core component is in a liquid state. In order to prevent the first monomers from reacting with water, which is the non-reactive medium, suitable protective colloids should be added to the non-reactive medium. The sodium or potassium salt of a homopolymer or a copolymer of vinylbenzene sulfonic or carboxylic acid, or its derivatives may be used for this purpose. The choice of the cation may be immaterial to this invention, and cations other than sodium or potassium may be used instead. Generally, the protective colloid may have a molecular weight in the range of 10,000 to 1,000,000. The polymer of vinylbenzene sulfonic or carboxylic acid, or its derivatives is supplied by Alco Chemical, a division of National Starch and Chemical Co. under the trade name Versa TL-132 (with average molecule weight 200,000) and Versa TL-150 (with average molecule weight 1,000,000), which are 10% solution of the sodium salts of polystyrenesulfonate. The sodium or potassium salt of a homopolymer or a copolymer of vinylbenzene sulfonic or carboxylic acid, or its derivatives may present in an amount of 1% to 5% (w/w) with respective to the continuous phase, preferably 2% to 3%.

Alternatively, polyacrylic acid or its derivative may be used as the protective colloid. Polyacrylic acid is usually supplied and used as an aqueous solution, and such can be diluted to 5% to 15% (w/w) with respect to the core component. In this research, 2–4 g of a 25% aqueous solution of polyacrylic acid was added to 60 g of continuous phase. Suitable molecular weight of polyacrylic acid may be in the range of about 100,000 to 500,000, and preferably in the range of about 200,000 to 300,000.

Addition of an amount of polypropylene glycols to the first solution can modify the surface tension of the paraffin compounds and so significantly improve their dispersion in the above emulsifying system. The amount of polypropylene glycol addition should be strictly controlled. Deficient addition would lead to unsatisfactory emulsification. Overdose, however, would cause the collapse of the microcapsules at elevated temperature in the bath, which would be due to the thick inner shell formation. In practice 1% to 4% (based on the weight of phase change materials) of polypropylen glycols with the average molecule weight higher than 400, and preferably in the range of 2,000 to 4,000, may be employed. Hexamethylenediisocyanate may also be employed in the core component since some "soft segment" can make the shell more flexible and reduced the risk of microcapsule collapse. Usually the addition of hexamethylenediisocyanate may be used in the amount ranging from 0.5% to 1% based on the weight of the core component.

As these polymers was believed to have low emulsifying ability for paraffin compounds when used as the protective colloids, an amount of the sodium salt of carboxymethyl cellusose (viscosity 3,000 to 6,000 centipoises, 1% aqueous solution) was mixed with the protective colloid to form the mixed protective colloid system. This was believed to be suitable due to both the relatively low reactivity of CMC towards the polyisocyanate in the core and its stronger emulsifying ability. Unfortunately the shell of the so formed microcapsules is not stable and the microcapsules were easily collapsed, which was even clearly observed during microscopic determination. Adding polypropylene glycols into the core materials and employing Versa TL-150 alone as the protective colloid proved to be satisfactory for dispersing process.

Performing the dispersing process in a limited time (usually 5 to 10 minutes) was found to be able to restrict the reaction between the polyisocyanate and water. Further, it was found that adding polypropylene glycols into the core component can promote the formation of tiny round oil droplets in the emulsifying bath. In the case when no polypropylene glycols are added only very few tiny oil droplets with smooth round shape are observed under a microscope after the micro-encapsulation process is completed. It is believed that paraffin compounds have low surface tension and are therefore difficult to be emulsified in the aqueous bath with the aforementioned protective colloids in the absence of polypropylene glycols.

Figure 2:
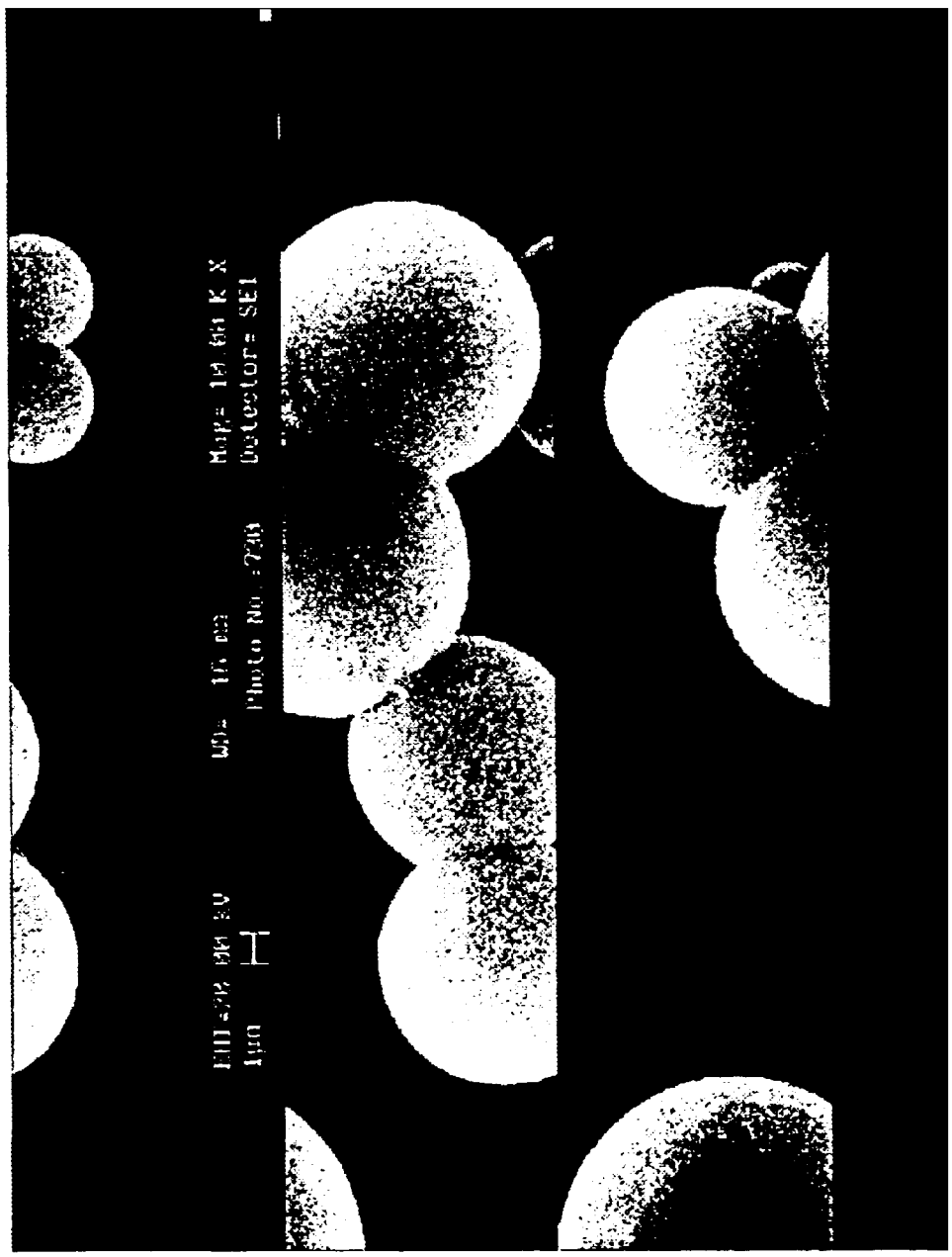
FIG. 2 shows the scanning electron micrograph of the microcapsules formed when sufficient polypropylene glycols were used.

After the dispersion, sufficient dilution by adding water to the non-reactive medium is essential in order to prevent the agglomeration. Generally, 10% to 30% of water with respect to the non-reactive medium is added for dilution. The second solution containing the second momoner, which is an aqueous solution of a suitable polyamines, is then gradually added to the emulsion under mild agitation or stirring, for example, stirring at a rate of 200–600 revolutions per minute. The polyamines with more than two functional groups can then quickly react with the diisocyanate in the core to form the outer polyurea shell, which will then prohibit the further reaction between the non-reacted diisocyanate in the core and the residual polyamines in the continuous phase. The remaining processes have already been disclosed in U.S. Pat. No. 4,076,774. Sepcifically, some of the isocyanate groups of the remained polyisocyanate in the core will react with the active hydrogen functionalities of the urea groups on the inner surface of the outer shell. At the elevated temperature the remained non-reacted isocyanate groups of the polyisocyanate in the core will react with the hydroxyl groups of the polypropylene glycols to form the inner polyurethane shell. The two linked shells can then form the double shell wrapper for the paraffin compounds with relatively low permeability. Scanning electronic microscope observation as shown in FIG. 1 indicated, in the research work, that the core materials significantly leaked from inside of the microcapsules after heat treatment of microcapsules emulsion samples if insufficient polypropylene glycols were employed. FIG. 2 shows scanning electronic micrograph of the microcapsules when sufficient polypropylene glycols is used. After the addition of polyamines, the final reaction is carried out at the elevated temperature for sufficient time so that the inner shell can be formed completely. It was found in this invention that the final mixture shall be kept at around 50° C. to 80° C. for about 3 to 5 hours to provide satisfactory results.

A brief, quick and qualitative method for checking both the dispersion and the microcapsule formation at any time after the addition of polyamines may also be used. In the checking process sufficient amount of the emulsion, say 1 to 10 drops, is taken and then added to a large amount of cold water bath, say in an amount of 25–300 ml, which was then followed by simple stirring with a glass rod. After standing, one can check whether there is any floating "ice flakes" (when the melting point of the paraffin compound used is higher than the bath temperature) or oil droplets (when the melting point of the paraffin compound used is lower than the bath temperature), and the bath turbidity. For a satisfactory manufacturing process no "ice flakes" or oil droplets can be observed, but very tiny solid particles can be found with the naked eyes and the bath should be clear. Although microscopic checking by means of both optical microscope and scanning electronic microscope is the more reliable and final means, the above process can be used to obtain the optimal micro-encapsulation conditions for a particular paraffin compound, or as a preliminary qualitative check.

The microencapsulated paraffin compounds emulsion can generally be handled relatively easily and can be applied as the medium for temperature management in many fields.

EXAMPLES

This invention is now illustrated by the following examples, which shall not be interpreted as limiting.

Example 1

Microencapsulation of Ocatadecane with Diethylenetriamine as the Coreactant

| Recipe for Non-Reactive Medium (Bath I) | |
|---|---|
| Versa TL 502 (10%, M.W. 1,000,000) | 10 g |
| Water | 50 g |
| Recipe for the First Solution (Bath II) | |
| Octadecane (99+ %) | 30 g |
| Tolylene 2,4-Diisocyanate (80%) | 3.0 g |
| Hexamethylenediisocyanate (99%) | 0.2 g |
| Polypropylene Glycol (M.W. 2,000) | 0.5 g |
| Recipe for the Second Solution (Bath III) | |
| Diethylenetriamine (98.5%) | 2.0 g |
| Water | 40 g |

Procedures

1. Bath II is dispersed in bath I under vigorous stirring at 33° C. for 5 minutes.
2. 40 ml of water at 33° C. is added for dilution under mild stirring (400 rpm) for 5 minutes.
3. Gradually add bath III to the above system and then stir the bath for 30 minutes.
4. Raise the system to 70° C. and then continue the reaction for 4 hours.
5. Cool the system to ambient temperature under the mild stirring and then complete the reaction.

Microscopic observation of the emulsion sample shows that the diameters of the microcapsulse are ranging from 5 to 30 micrometer. All of the inspected microcapsules appeared both smooth and round.

Example 2

Microencapsulation of Ocatadecane with Tetraethylenepenamine as the Coreactant

| Recipe for Non-Reactive Medium (Bath I) | |
| --- | --- |
| Versa TL 502 (10%, M.W. 1,000,000) | 10 g |
| Water | 50 g |
| Recipe for the First Solution (Bath II) | |
| Octadecane (99+ %) | 30 g |
| Tolylene 2,4-Diisocyanate (80%) | 3.0 g |
| Hexamethylenediisocyanate (99%) | 0.2 g |
| Polypropylene Glycol (M.W. 2,000) | 0.5 g |
| Recipe for the Second Solution (Bath III) | |
| Tetraethylenepenaniine (98.5%) | 1.0 g |
| Water | 40 g |

The procedures involved were the same as described in Example 1. Microscopic observation of the emulsion sample shows that the diameters of the microcapsulse are ranging from 5 to 30 micrometer. All of the inspected microcapsules appeared both smooth and round.

Example 3

Microencapsulation of Ocatadecane with Diethylenetriamine as the Coreactant

| Recipe for Non-Reactive Medium (Bath I) | |
| --- | --- |
| Polyacrylic Acid (25%, M.W. 230,000) | 3 g |
| NaOH (10%) | 3 g |
| Water | 54 g |
| Recipe for the First Solution (Bath II) | |
| Octadecane (99+ %) | 30 g |
| Tolylene 2,4-Diisocyanate (80%) | 3.0 g |
| Hexamethylenediisocyanate (99%) | 0.2 g |
| Polypropylene Glycol (M.W. 2,000) | 0.5 g |
| Recipe for the Second Solution (Bath III) | |
| Diethylenetriamine (98.5%) | 2.0 g |

Water 40 g

The procedures involved were the same as described in Example 1. Microscopic observation of the emulsion sample shows that the diameters of the microcapsulse are ranging from 5 to 30 micrometer. All of the inspected microcapsules appeared both smooth and round.

While the preferred embodiment of the present invention has been described in detail by the examples, it is apparent that modifications and adaptations of the present invention will occur to those skilled in the art. It is to be expressly understood, however, that such modifications and adaptations are within the scope of the present invention, as set forth in the following claims. Furthermore, the embodiments of the present invention shall not be interpreted to be restricted by the examples or figures only.

What is claimed is:

1. A method for encapsulating a core component comprising paraffin compounds that can undergo phase transition, including the steps of:
    A dissolving the core component in a first solvent to form a first solution, said first solvent being non-reactive to the core component and includes first monomers to form a first polymer, and the core component being insoluble in the first polymer;
    B dispersing the first solution throughout a non-reactive medium that is immiscible with the first solution, to form a dispersion of droplets of the first solution;
    C forming an outer second polymer wall at the surface of said droplets of the first solution before the first polymer is formed by adding a second monomer to said dispersion with simultaneous mild stirring, such that the inner first polymer wall is formed inside the outer second polymer wall and cross-links with the outer second polymer wall, and the core component is encapsulated in a double layer microcapsule
    characterized in that the first monomer includes at least two organic compounds, one organic compound having two isocyanate groups and is soluble in said paraffin compound; and a further organic compound is a polypropylene glycol with an average molecular weight higher than 400.

2. The method of claim 1, wherein the paraffin compounds have 13 to 28 carbon atoms.

3. The method of claim 1, wherein the average molecular weight of the polypropylene glycol is higher than 400.

4. The method of claim 3, wherein the average molecular weight of the polypropylene glycol is 2000 to 4000.

5. The method of claim 3, wherein the polypropylene glycol is 1% to 4% based on the weight of the core component.

6. The method of claim 1, wherein the first monomer is selected from the group consisting of tolylene-2,4-diisocyanate, hexamethylene diisocyanate or mixture thereof.

7. The method of claim 6, wherein the first monomer is tolylene-2,4-diisocyanate, and 0.5 to 1 weight percent of hexamethylene diisocyanate with respect to the core component is added as a softening agent.

8. The method of claim 1, wherein the non-reactive medium is water and also includes a protective colloid selected from the group consisting of a salt of homo-polymer or co-polymer of vinylbenzene sulfonic or carboxylic acid, or its derivative, or homo-polymer or co-polymer of acrylic acid or its derivative.

9. The method of claim 8, wherein the protective colloid has a molecular weight of 10,000 to 1,000,000.

10. The method of claim 8, wherein the salt is a sodium or potassium salt.

11. The method of claim 8, wherein the protective colloid is a salt of homo-polymer or co-polymer of vinylbenzene sulfonic or carboxylic acid, or its derivative in an amount of 1 to 5 weight percent with respect to the core component.

12. The method of claim 11, wherein the protective colloid is in an amount of 2 to 3 weight percent with respect to the core component.

13. The method of claim 8, wherein the protective colloid is a salt of homo-polymer or co-polymer of acrylic acid or its derivative in an amount of 5 to 15 weight percent with respect to the core component.

14. The method of claim 8, wherein the first solution is dispersed into the non-reactive medium at a temperature higher than the melting point of the core component.

15. The method of claim 8, wherein the first solution is dispersed into the non-reactive medium at a temperature 5° C. higher than the melting point of the core component.

16. The method of claim 8, wherein the first solution is dispersed into the non-reactive medium for 5 to 10 minutes.

17. The method of claim 8, wherein the protective colloid is a sodium salt of polystyrenesulfonate having an average molecular weight of 1,000,000.

18. The method of claim 1, wherein the second monomer is added under a stirring rate of 200 to 600 revolutions per minute.

19. The method of claim 1 further including the step of maintaining the mixture formed in Step C at a temperature of 50 to 80° C. for 3 to 5 hours.

20. A dual-wall microcapsule encapsulating a core component comprising paraffin compounds that can undergo phase transition manufactured by the method of claim 1.

21. A method of inspecting microcapsule formation by the micro-encapsulation method of claim 1 including the steps of:
  adding 1 to 10 drops of the mixture formed after step C to 25 to 300 ml of water and stirring the resulting mixture;
  allowing the resulting mixture to stand for a sufficient period of time;
  determining whether the micro-encapsulation process is satisfactory, wherein a satisfactory micro-encapsulation process is characterized by either one of the following observations:
  there is no oil or fat floating on the surface of the resulting mixture; or
  the mixture is clear.

* * * * *